United States Patent
Yu et al.

(10) Patent No.: US 12,423,613 B2
(45) Date of Patent: Sep. 23, 2025

(54) ENVIRONMENT-SPECIFIC TRAINING OF MACHINE LEARNING MODELS

(71) Applicant: Microsoft Technology Licensing, LLC, Redmond, WA (US)

(72) Inventors: Pei Yu, Bellevue, WA (US); Zicheng Liu, Bellevue, WA (US); Ying Jin, Kirkland, WA (US); Yinpeng Chen, Sammamish, WA (US); Kun Luo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1164 days.

(21) Appl. No.: 17/236,794

(22) Filed: Apr. 21, 2021

(65) Prior Publication Data

US 2022/0343205 A1 Oct. 27, 2022

(51) Int. Cl.
  *G06N 3/096* (2023.01)
  *G06N 5/04* (2023.01)
  *G06N 20/00* (2019.01)

(52) U.S. Cl.
  CPC ............. *G06N 20/00* (2019.01); *G06N 3/096* (2023.01); *G06N 5/04* (2013.01)

(58) Field of Classification Search
  CPC .......... G06N 20/00; G06N 3/096; G06N 5/04; G06N 3/045; G06N 3/082
  See application file for complete search history.

(56) References Cited

U.S. PATENT DOCUMENTS

| 2020/0034702 A1 | 1/2020 | Fukuda et al. |
| 2020/0244770 A1 | 7/2020 | Cooley et al. |

(Continued)

FOREIGN PATENT DOCUMENTS

| CN | 110162018 A | 8/2019 |
| CN | 110232411 A | 9/2019 |
| CN | 111461212 A | 7/2020 |

OTHER PUBLICATIONS

Kasarla, Tejaswi, "Efficient Annotation and Knowledge Distillation for Semantic Segmentation", In Thesis submitted to International Institute of Information Technology, Jul. 2019, 66 Pages.

(Continued)

*Primary Examiner* — Sanchita Roy
(74) *Attorney, Agent, or Firm* — Alleman Hall & Tuttle LLP

(57) ABSTRACT

A method for environment-specific training of a machine learning model, comprises receiving, for a local environment, a data stream including a plurality of sequential data snippets. Programmed labels are generated for each data snippet using a student version of a machine learning model. A portion of data snippets and associated programmed labels are selected and uploaded to a server-side computing device for evaluation by a teacher version of the machine learning model. An environment-specific training update is received from the server-side computing device. This training update is based on a comparison of the selected programmed labels and pseudolabels generated for the selected portion of data snippets by the teacher version. The environment-specific training update is applied to the student version to generate an updated student version. The updated student version of the machine learning model is then used to generate programmed labels for newly received data snippets.

20 Claims, 6 Drawing Sheets

(56) References Cited

U.S. PATENT DOCUMENTS

2020/0387782 A1   12/2020  Hegde et al.
2021/0142177 A1*   5/2021  Mallya ................. G06N 3/084
2022/0012637 A1*   1/2022  Rezazadegan Tavakoli ..............
                                                    G06N 3/088
2022/0114476 A1*   4/2022  Bui ...................... G06N 3/044
2022/0284891 A1*   9/2022  Park ................... G06N 3/0464

OTHER PUBLICATIONS

Mirzadeh, et al., "Improved Knowledge Distillation via Teacher Assistant", In Repository of arXiv:1902.03393v2, Dec. 17, 2019, 11 Pages.

Zhou, et al., "Distilled One-Shot Federated Learning", In Repository of arXiv:2009.07999v2, Oct. 26, 2020, 14 Pages.

Chung, et al., "ShadowTutor: Distributed Partial Distillation for Mobile Video DNN Inference", In Proceedings of 49th International Conference on Parallel Processing, Aug. 17, 2020, 11 Pages.

"International Search Report and Written Opinion Issued in PCT Application No. PCT/US22/023180", Mailed Date: Aug. 19, 2022, 12 Pages.

First Office Action Received for Chinese Application No. 202280029403.1, mailed on Jul. 24, 2025, 07 pages. (English translation Provided).

* cited by examiner

ENVIRONMENT-SPECIFIC TRAINING OF MACHINE LEARNING MODELS

BACKGROUND

Powerful machine learning models may be used to perform tasks such as image analysis, speech recognition, natural language processing, data analysis, etc. Given enough time and computing resources to perform such tasks, a well-trained machine learning model may provide accurate, replicable analysis. For scenarios where real-time analysis is desired, and/or when local computing resources are limited, knowledge from a heavy machine learning model may be distilled into a lighter model for local deployment without sacrificing validity.

SUMMARY

A method for environment-specific training of a machine learning model, comprises receiving, for a local environment, a data stream including a plurality of sequential data snippets. Programmed labels are generated for each data snippet using a student version of a machine learning model. A portion of data snippets and associated programmed labels are selected and uploaded to a server-side computing device for evaluation by a teacher version of the machine learning model. An environment-specific training update is received from the server-side computing device. This training update is based on a comparison of the selected programmed labels and pseudolabels generated for the selected portion of data snippets by the teacher version. The environment-specific training update is applied to the student version to generate an updated student version. The updated student version of the machine learning model is then used to generate programmed labels for newly received data snippets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Machine learning models may be employed to perform a wide variety of functions in a number of environments. The machine learning model may be assigned tasks such as image classification, voice recognition, interpreting text, human pose and gesture estimation, person detection, object counting, etc. Such tasks may be performed using data collected for any suitable environment via one or more sensors or any other suitable collection mechanism.

Figure 1:
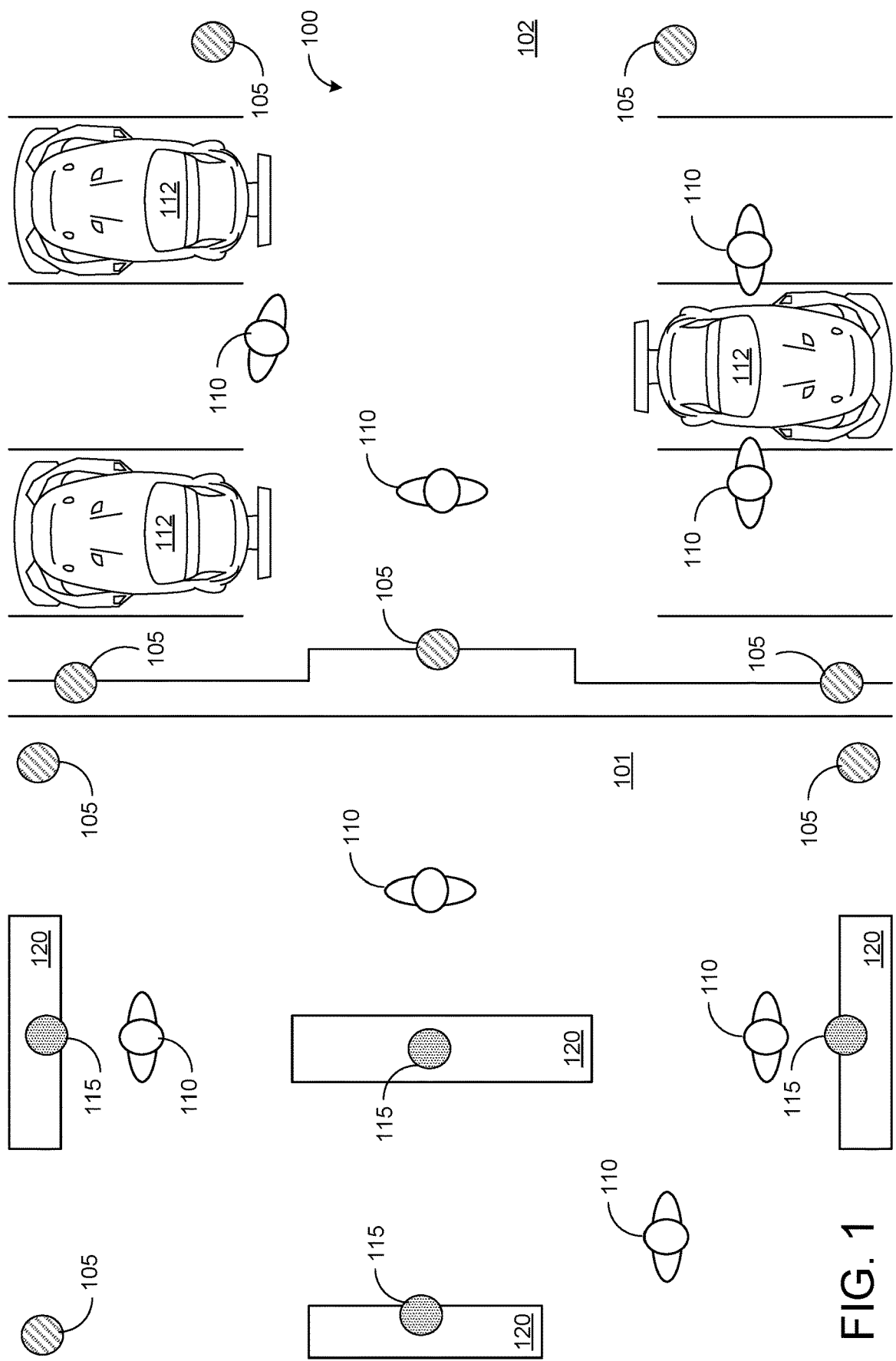
FIG. 1 shows an example local environment for deployment of a machine learning model.

FIG. 1 depicts an example local environment 100 including a retail store 101 and adjoining parking lot 102. A number of surveillance cameras 105 are trained on the interior of retail store 101 and on the parking lot 102. Each surveillance camera may include one or more 2D imaging devices. Image data acquired by the surveillance cameras may be used to detect objects such as people 110 and vehicles 112, and/or other items relevant to store management, such as bicycles, shopping carts, assisted mobility devices, etc. Image data from surveillance cameras 105 may further be used to recognize individuals or analyze movement or other behavior of people, individually or in relevant groupings.

Additional environmental sensors 115 may include 3D imaging devices, microphones, etc. with which to mediate human-computer interactions. For example, data from 2D and/or 3D imaging devices may facilitate pose and/or gesture detection for use in video games or other natural language input applications, such as interactive kiosks 120, which may also use data from microphones to provide voice commands, transcription services, etc.

Machine learning models deployed in the above-referenced example environments typically are generic and trained on common data sets. However, there may be factors that are unique to particular local environments that can confound a machine learning model, but that may not be present in other environments. For example, parking lot 102 may have a specific pattern of light (e.g., sunlight, shadows, artificial lighting) over the course of the day that may benefit from site-specific processing to enable accurate image analysis. The location of retail store 101 may impact the demographics of the clientele, which in turn may mean a higher incidence of certain spoken languages/dialects/accents etc. Deploying a machine learning model that is trained on all possible environmental factors would potentially result in bloated software that could struggle to quickly and accurately respond to real-time data from the environmental sensors. Training each machine learning model for its own local environment is preferential, but also challenging.

In conventional teacher-student models, the teacher version and student version operate the same model, which is often a generic model. Training occurs based on the teacher version and the student version evaluating the same static, benchmarked data set. Nothing can be distilled, so the student version cannot be improved other than by reviewing the teacher version's inference on the data set. Such conventional active learning methods rely on human efforts to label selected data. Generally, the student version is trained on all available data, resulting in a slow training process and inefficient productions of model updates. Similarly, conventional distillation methods distill knowledge from the teacher version to the student version based on all available data. This process is also relatively slow, and thus not suitable for continuous training in a practical scenario, where the amount of real-time data received and evaluated can be enormous.

Herein, systems and methods are described for an active distillation framework that enables automatic, scalable, and cost-efficient performance improvement for a light-weight student version of a machine learning model within a specific environment. In some embodiments, a heavyweight, teacher version of the machine learning model uses actively selected training data as the basis of a fast, incremental training process, whereby the training data is selected from data received in the deployment environment. The student version may operate online, generating programmed labels for data snippets in real-time. The teacher version may operate off-line, using additional time and complexity to generate pseudolabels for a portion of the data snippets that have been program-labeled by the student version, and then iteratively deploy training updates based on comparisons of the pseudolabels and the programmed labels. This workflow enables an incremental, feedback driven training scheme that does not require human labeling to improve the student version. Indeed, the server hosting the teacher version may continuously train numerous student versions from different environments in parallel, providing environment-specific training updates to each client based on data from the deployment environment of each student version. Each student version may thus be tuned for its own environment without becoming overly large and complicated. Conventional methods, where data is collected manually for an environment, may be practical for a single client, but are not practical for a mass deployment scenario.

Figure 2:
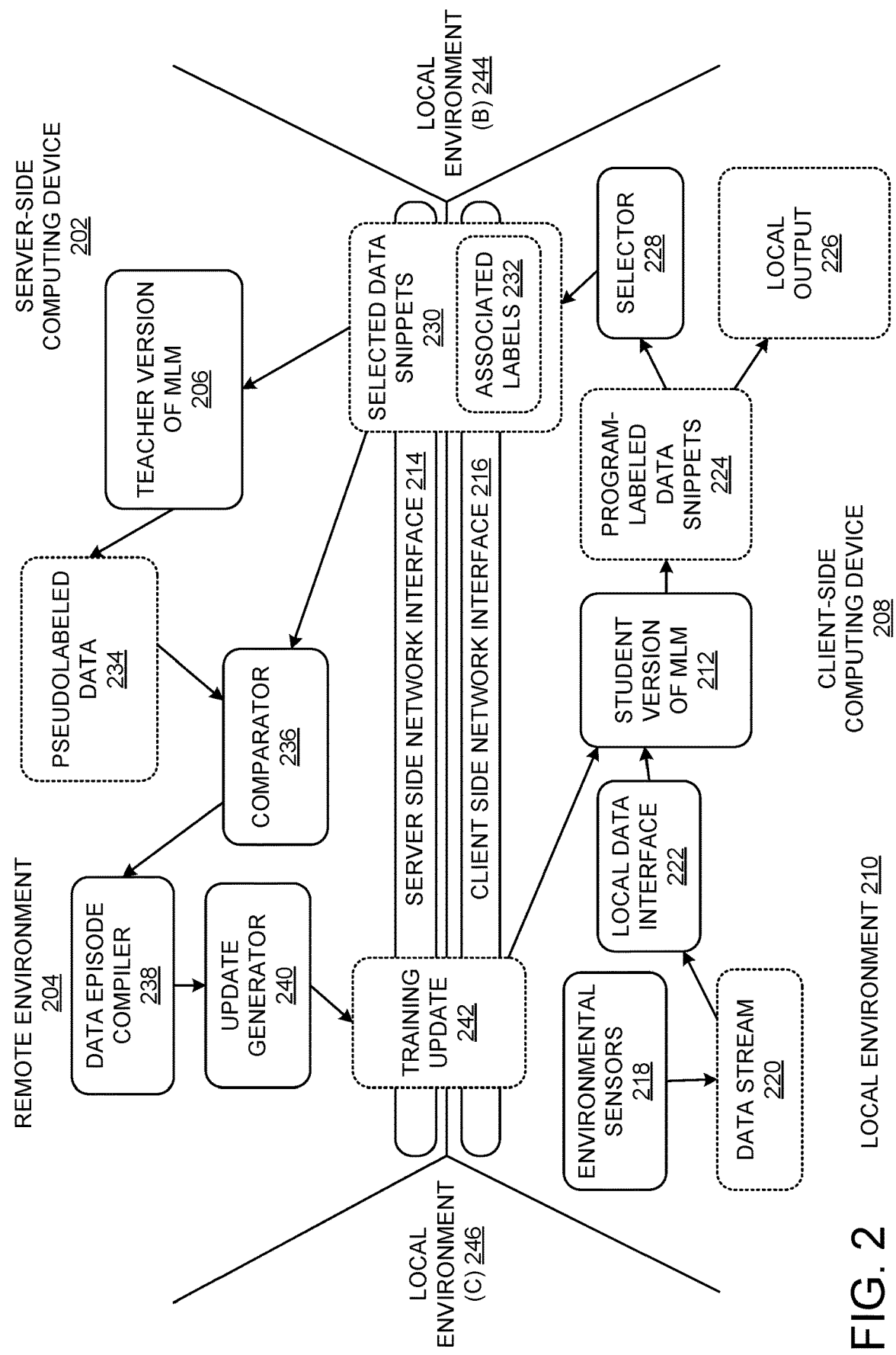
FIG. 2 shows an example computing system for deploying and updating a machine learning model in a local environment.

FIG. 2 schematically shows an example system 200 for deploying and training a machine learning model for a local environment. System 200 includes a server-side computing device 202 situated in a remote environment 204 and operating a teacher version of a machine learning model 206. System 200 further includes a client-side computing device 208 situated in local environment 210 and configured to operate a student version 212 of the machine learning model.

Remote environment 204 may be a physical location, such as a server bank, and/or may be a cloud computing environment. In some examples, server-side computing device 202 may be situated in or closely tethered to local environment 210. Local environment 210 may be any suitable environment from which data can be gathered and then analyzed by student version 212.

Both teacher version 206 and student version 212 of the machine learning model may be any suitable machine learning models, such as a deep neural networks, deep learning neural networks, deep convolutional neural networks, recurrent neural networks, etc. Additional examples of machine learning models and neural networks are described herein and with regard to FIG. 6.

Teacher version 206 and student version 212 may be the same machine learning model, such as the same neural network. Teacher version 206 may be configured to generate and deploy student version 212. Student version 212 may be considered a lightweight version of the machine learning model, while teacher version 206 may be considered a heavyweight version of the machine learning model. For example, teacher version 206 may include deeper layers, wider layers, more neurons, etc. Further, while student version 212 may operate in real-time or near real-time, teacher version 206 may effectively operate off-line with the luxury of additional time to run inference on data. The deployed student version 212 of the machine learning model may thus be more lightweight and scaled down.

Teacher version 206 may initially be trained at least in part through human supervision. Additional updates to the teacher version may be generated through supervised training, and/or via a higher level of active distillation training via a heavier-weight principal version of the machine learning model. Teacher version 206 may be configured to provides distillation training service for student version 212, thereby incrementally finetuning student version 212 within client-side computing device for its environment.

Server-side computing device 202 includes server-side network interface 214, configured to communicate with client-side network interface 216 operating as part of client-side computing device 208. Server-side network interface 214 and client-side network interface 216 may operate to mediate communication between server-side computing device 202 client-side computing device 208 including the uploading and downloading of data snippets, associated programmed labels, and training updates.

Environmental sensors 218 may collect data from local environment 210, which may then generate and/or enter data stream 220. Environmental sensors 218 may include passive sensors, which collect data continuously, and/or prompted sensors, which collect data for a duration when conditions for data collection are met. Environmental sensors 218 may include 2D imaging devices, 3D imaging devices, microphones, seismic sensors, meteorological sensors, pressure sensors, radiation sensors, and/or any sensor configured to recognize, collect, and store data about its surrounding environment.

Data stream 220 may include data output by environmental sensors 218, data transcripts that are either not generated from local environment 210 or indirectly generated via local environment 210. Although directed towards applications where data is generated by environmental sensors 218 within local environment 210 and processed by client-side computing device 208 located in the same environment, positioning the sensors and processors in separate sub-environments has been considered.

Data stream 220 includes a plurality of sequential data snippets. Each data snippet may be of a fixed size or duration, or may be of a variable size or duration. For example, in scenarios where data stream 220 includes one or more 2D image streams, each data snippet may include one or more image frames. In scenarios where data stream 220 includes one or more 3D image streams, and each data snippet may include one or more 3D image frames. In scenarios where data stream 220 includes one or more audio streams, and each data snippet may include a finite chunk of audio data. For image detection or counting algorithms, each collected frame may be sent to data stream 220, periodic frames may be sent to data stream 220, and/or prompted frames may be sent to data stream 220. For example, a facial recognition algorithm may only receive frames taken within a duration following a door opening prompt. Similarly, natural language recognition programs may send continuous data streams or data chunks wherein an individual has been recognized by the sensor, and/or when a pose or gesture is likely to have been initiated. For speech recognition and transcribing applications, each data snippet may comprise one or more recognized utterances featuring a pause or below-threshold amplitude on either side of the utterance. For example, each data snippet may include a word, a phrase, a sentence, etc. In some examples, a data snippet may include a fixed-size duration of an audio recording.

A local data interface 222 may be configured to receive data stream 220 including a plurality of sequential data snippets for local environment 210 and to provide data stream 220 to student version 212. Student version 212 may be configured to run inference on incoming data stream 220. Student version 212 may be configured to generate and output programmed labels for each data snippet based on the results of the inference, and thus output program-labeled data snippets 224. In this scenario, a "programmed label" refers to a label that is automatically applied to a data snippet following analysis by student version 212. For example, if student version 212 is tasked with identifying each person in a 2D image frame, programmed labels may be appended to coordinate locations on the 2D image where the inference run by student version 212 indicates is above a threshold likelihood of being occupied by a person. A further programmed metalabel may tally the total number of persons inferred by student version 212 for the image frame (e.g., data snippet). The nature of the programmed labels may depend on the tasks assigned to student version 212. A speech recognition task may result in programmed labels indicating which word may have been spoken in a data snippet, whether or not a specific word or sequence of words was spoken in a data snippet. In other words, the programmed labels represent the best guess or inference by student version 212 as to whether the data snippet includes certain data elements as described in the machine learning model. As described further herein, student version 212 may be trained for local environment 210 based on data stream 220 and program-labeled data snippets 224.

Student version 212 of the machine learning model may further be configured to provide at least some of the program-labeled data snippets 224 to a local output 226. For example, local output 226 may be a local computing device that presents data from one or more program-labeled data snippets 224 to a human operator or uses information from program-labeled data snippets 224 to initiate an automated task. Local output 226 may translate program-labeled data snippets for immediate use within local environment 210. For example, labeled 2D images may be used to identify objects and/or people within local environment 210. This may enable computing devices or human operators to recognize individuals and objects and/or count people or objects within the local environment. Within environment 100 shown in FIG. 1, this may enable the store to track the number of people 110 in the retail store 101 or parking lot 102, the number of vehicles 112 or shopping carts within the parking lot, etc. The store may additionally or alternatively be able to track movement of specific individuals as they traverse the aisles and departments of the store. This data may be tracked over time to inform management of the store about customers over time, customer shopping patterns, etc. For natural language purposes, recognition of a performed gesture may inform a command at a kiosk, gaming device, or other computing devices, or whether the data stream is of 2D or 3D images. For speech recognition applications, the data may include verbal commands, transcription, etc. The programmed labels may indicate what the student version thinks is being said, and/or whether a certain word or command is being uttered, and with what frequency.

Rather than uploading all of program-labeled data snippets, selector 228 may be configured to select a portion of data snippets for evaluation by teacher version 206 of the machine learning model for distillation training service of student version 212. Selector 228 may employ a selection process that reduces the amount of data uploaded to the server-side computing device, thus reducing training and student version update time. Selector 228 may include one or more computing devices, and/or may be installed as a program, module, or engine on one or more computing devices. Selector 228 may be configured to receive a stream of data snippets, and to output a portion of data snippets (e.g., less than all of the received data snippets). Selection of the output portion of data snippets may occur actively or passively, as described herein. Selected data snippets 230 and associated labels 232 may be uploaded to teacher version 206 for evaluation and bundling into data episodes.

Selector 228 may receive program labelled data snippets 224, either including both the data snippets and their associated programmed labels, or as either a raw or filtered feed of data stream 220. Herein, a "raw" data stream may refer to unprocessed image data, whereas the data stream may undergo some processing or filtering prior to generating a data snippet that can be labeled by student version 212. Selector 228 may then designate a portion of program labelled data snippets 224. Selector 228 may be tasked with obtaining a representative sample of data snippets, including a variety of signals and information that teacher version 206 may use to improve the performance of student version 212 when similar signals and information are encountered.

In some examples, selector 228 may use random selection of data snippets (e.g., 1% of all incoming data snippets) without regard for their associated programmed labels. This frequency may be adjustable based on dynamic information included in data stream 220, or based on predetermined rules. In other examples, selected data snippets 230 may be selected at least in part based on their associated labels 232. In some examples, the appearance or absence of a particular label may inform selector 228. For example, if student version 212 is tasked with counting pickup trucks in a parking lot, data snippets may be preferentially selected to include a variety of pickup truck to total vehicle ratios, where some data snippets appear to demonstrate a majority of pickup trucks and some data snippets appear to indicate a lack of pickup trucks. For voice command or posture recognition tasks, a certain number of data snippets with a positive event recognition may be selected, along with a certain number of data snippets with negative event recognition as controls.

In some examples, labels and/or other information relevant to recent training updates may be weighted more heavily. For example, if a person counting algorithm is underperforming in images taken during sunny conditions, an applied update may be generated to improve person counting in such conditions. As such, data snippets featuring those conditions may be overrepresented in the selection process. In speech recognition modules, if the algorithm is incorrectly recognizing certain words, for example due to an accent common in the local environment, an update may target those speech patterns. As such, data snippets featuring labels that indicate the corrected words and/or labels that indicate guesses that are likely to be erroneous may be overrepresented at selector 228.

In some examples, an intermediate output of student version 212 may be used by selector 228 to generate selected data snippets 230. As an example, confidence intervals for labels output by the student model may inform selection, as student version 212 may effectively learn over time what kind of questions they have trouble with. Other data included in a data snippet such as movement or rate of change in video frames may be used to increase selection rate during times of high activity, and decrease selection rate during periods where image data is relatively static from frame to frame. Further, if the labels are fluctuating at a high rate, this may indicate that the student version is facing a challenging inference, and thus data snippets for this time period may be overrepresented in selected data snippets 230.

In some examples, a data snippet may be selected based on similarities or differences to already selected data snippets 230 to provide positive and/or negative controls for evaluation. Selected data snippets 230 and their associated labels 232 may be uploaded one at a time, bundled into a fixed size data packet, a variable sized data packet, or a data episode (described further herein).

Teacher version 206 receives selective data snippets 230 and may additionally receive associated programmed labels 232. Teacher version 206 then generates pseudolabeled data 234 for the received portion of selected data snippets 230, for example, by running inference on the portion of selected data snippets 230. Similarly to programmed labels, pseudolabels may be considered labels applied to a data snippet based on a machine learning algorithm or task assigned to teacher version 206. Neither the programmed labels nor the pseudolabels are verified by a human ground truther. As such, these labels are both merely inferences. However, teacher version 206, possessing additional time, computing power, and experience, may be assumed to be more accurate than student version 212 at performing the same task. As such, pseudolabels applied by teacher version 206 may be considered to be more accurate than the programmed labels applied by student version 212 for the same data snippet. In some examples, teacher version 206 may generate pseudolabels for the portion of selected data snippets 230 without regard to the associated programmed labels 232. Additionally or alternatively, teacher version 206 may specifically determine whether an associated programmed label was applied correctly.

For 2D image data, for example, teacher version 206 may be able to use higher resolution images than did student version 212, and thus be able to discern more features of target objects. Conversely, student version 212, which is limited in time available for data snippet inference, may be working with lower resolution images at a rapid speed and may not have been extended the training to discern a target object from a modest number of pixels worth of data.

Student version 212 may only be able to target a single or low number of solutions, while teacher version 206 has the time and capability and experience to work on multiple solutions, be it simultaneously or sequentially. One such approach is called multi-scale testing or multi-scale inference. For example, if student version 212 and teacher version 206 are executing the same basic machine learning model for 2D image analysis, teacher version 206 may operate 4× per frame at different resolutions, scale up images, scale down images, chop up the frames, etc. allowing for the identification of multiple solutions. From this, teacher version 206 may generate pseudolabels for each selected data snippet.

Comparator 236 may receive pseudolabels 234 and programmed labels 232 for selected data snippets 230, and perform a comparison. Comparator may record instances where student version 212 mislabeled, underlabeled, or otherwise incorrectly labeled a data snippet. For example, a programmed label 232 may be inaccurate, or teacher version 206 may apply a pseudolabel identifying an object that was not identified by student version 212. The pseudolabeled data 234 and associated labels 232 for selected data snippets 230 may be used to train student version 212 using a process of distillation. In this way, student version 212, may receive training that is specific to local environment 210, as teacher version 206 can identify a more accurate inference on each selected data snippet 230, and may identify commonalities across mislabels and missed targets that may be caused by environmental features. For example, teacher version 206 may identify patterns in the lower-resolution data snippets that can be used by student version 212 to generate higher-confidence labels, or to positively label objects within the data snippets that were missed altogether.

Data episode compiler 238 may compile selected data snippets 230, associated labels 232 and pseudolabels 234 into discreet data episodes and determine when a data episode is sufficient to be the basis for retraining student version 212. Data episodes may include a predetermined number of data snippets or a dynamically determined number of data snippets. A data episode may be considered as a collection or installment of data used for generating a training update. Each data episode may be of a fixed length or a variable length, e.g., depending on the available data snippets. Data episodes may be compiled and issued sequentially.

Once a data episode has been compiled, an update generator 240 may generate a training update 242 specific to student version 212 and local environment 210. The training update may add features, parameters, and/or layers to the student version in order to improve performance of the student version within local environment. Improved performance of student version 212 may include an increased accuracy in programmed labels compared with pseudolabels applied by teacher version 206 for the same data snippets. In some examples, training update 242 may adjust parameter weights, such as increasing an emphasis on certain parameters. Additionally or alternatively, training update may remove unused or ineffective features, parameters, layers, etc.

Once generated and configured through distillation training, training update 242 may be deployed to client-side computing device 208 to generate an updated build of student version 212. Training update 242 may include selection parameters on which selector 228 may base selection of selected data snippets 230. For instances where selector 228 uses random selection, the selection frequency may be increased or decreased based on the performance of student version 212 over the previous data episode. For example, if teacher version 206 labeled 75% of selected data snippets 230 as including a target object, but student version 212 only labeled 62% of the same data snippets as including the target object, the sampling frequency may be increased until student version 212 reaches a threshold for target object identification.

Frequencies and/or thresholds may also be adjusted for instances where directed or targeted (e.g., intelligent) selection is used to select data snippets 230. For example, specific data snippets may be selected based on a threshold confidence level in a programmed label and/or based on a labeling ambiguity (e.g., two or more labels with a similar confidence rating). Data snippets may be selected that include features specific to a new training update feature.

Particularly for data snippets that are variable in length (e.g., pose determination, speech recognition), a combined selection may be applied, wherein some data snippets are targeted based on an applied label, and some data snippets are selected randomly or pseudo-randomly, for example, data snippets that do not include the applied label, but do include some feature similarities, such as content, duration, background, etc. In some examples, such a combined selection approach may be used to generate matched pairs or matched sets of data snippets where a labeled data snippet is matched with one or more differently labeled and/or unlabeled data snippets that nevertheless include some similar characteristics. In this way, teacher version 206 may evaluate student version 212 using a case-control model.

In some examples, one server-side computing device 202 may be communicatively coupled to multiple local clients running in local environments such as local environment (b) 244 and local environment (c) 246. The same student version 212 may initially be deployed to local environment (b) 244 and local environment (c) 246. However, as each student version is trained specifically to their local environment, the training updates provide to each local environment may cause the student versions to diverge over time. If local environment 210, local environment (b) 244, and/or local environment (c) 246 share characteristics, lessons from training one student version may be applied to other student versions to accelerate their training. For example, rare events may be pooled across local environments to improve their detection schemes for all student versions.

Figure 3:
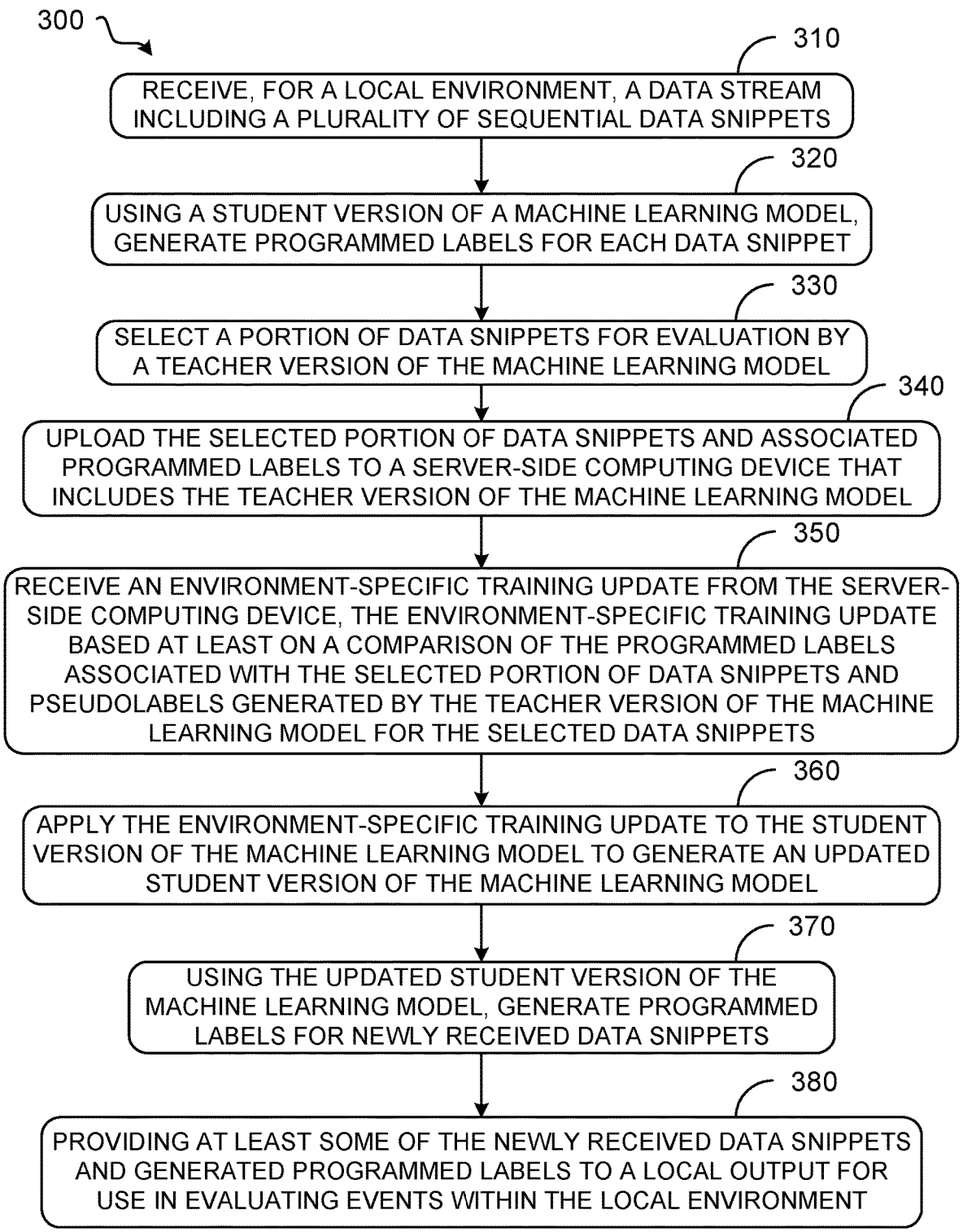
FIG. 3 is an example method for environment-specific training of a machine learning model.

FIG. 3 depicts a method 300 for environment-specific training of a machine learning model. Method 300 may be executed by a client-side computing device operating in a local environment, such as client-side computing device 208.

At 310, method 300 includes receiving, for a local environment, a data stream including a plurality of sequential data snippets. For example, locally positioned environmental sensors, such as imaging sensors, microphones, etc., may output continuous streams of data snippets that are received at a local data interface. Each data snippet may be a block of evaluatable data, such as one or more image frames, a chunk of audio data, etc.

At 320, method 300 includes using a student version of a machine learning model to generate programmed labels for each data snippet. The student version of the machine learning model may be assigned one or more tasks that result in programmed labels being applied to some data snippets. For example, such a task may include identifying and/or counting objects in an image frame, identifying a posture or gesture across a series of image frames, recognizing verbal commands and utterances, etc. The student version may, at the best of its ability given its current training, perform inference on the data snippets and label the data snippets accordingly, and where appropriate.

At 330, method 300 includes selecting a portion of data snippets for evaluation by a teacher version of the machine learning model. In some examples, the portion of data snippets selected for evaluation are selected randomly. Additionally or alternatively, the portion of data snippets selected for evaluation may be selected at least in part based on the programmed labels. As an example, the portion of data snippets selected for evaluation are selected at least in part based on confidence ratings assigned to one or more programmed labels. At 340, method 300 includes uploading the selected portion of data snippets and associated programmed labels to a server-side computing device that includes the teacher version of the machine learning model.

At 350, method 300 includes receiving an environment-specific training update from the server-side computing device, the environment-specific training update based at least on a comparison of the programmed labels associated with the selected data snippets and pseudolabels generated by the teacher version of the machine learning model for the selected data snippets. In some examples, the environment-specific training update may be further based on data comparisons made in other, similar environments.

At 360, method 300 includes applying the environment-specific training update to the student version of the machine learning model to generate an updated student version of the machine learning model. In some examples, the environment-specific training update includes one or more selection parameters usable to determine a portion of newly received data snippets to select for evaluation by the teacher version of the machine learning model. For example, the one or more selection parameters included in the training update may include a selection frequency.

At 370, method 300 includes using the updated student version of the machine learning model to generate programmed labels for newly received data snippets. At 380, method 300 includes providing at least some of the newly received data snippets and generated programmed labels to a local output for use in evaluating events within the local environment. For example, the newly received data snippets and generated programmed labels may be evaluated to determine the frequency of an event, the presence/absence of an event, etc.

Optionally, method 300 may include iteratively performing an updating procedure, the updating procedure comprising selecting a portion of newly received data snippets and uploading the selected portion of newly received data snippets to the server-side computing device for evaluation by the teacher version of the machine learning model, receiving new environment-specific training updates from the server-side computing device, and applying the new environment-specific training updates to generate updated student versions of the machine learning model.

In this way, the student version may iteratively report back to the teacher version to provide information on how the model is performing following each update.

The student version can continuously be tuned to the local environment, even if the environment itself changes over time.

Figure 4:
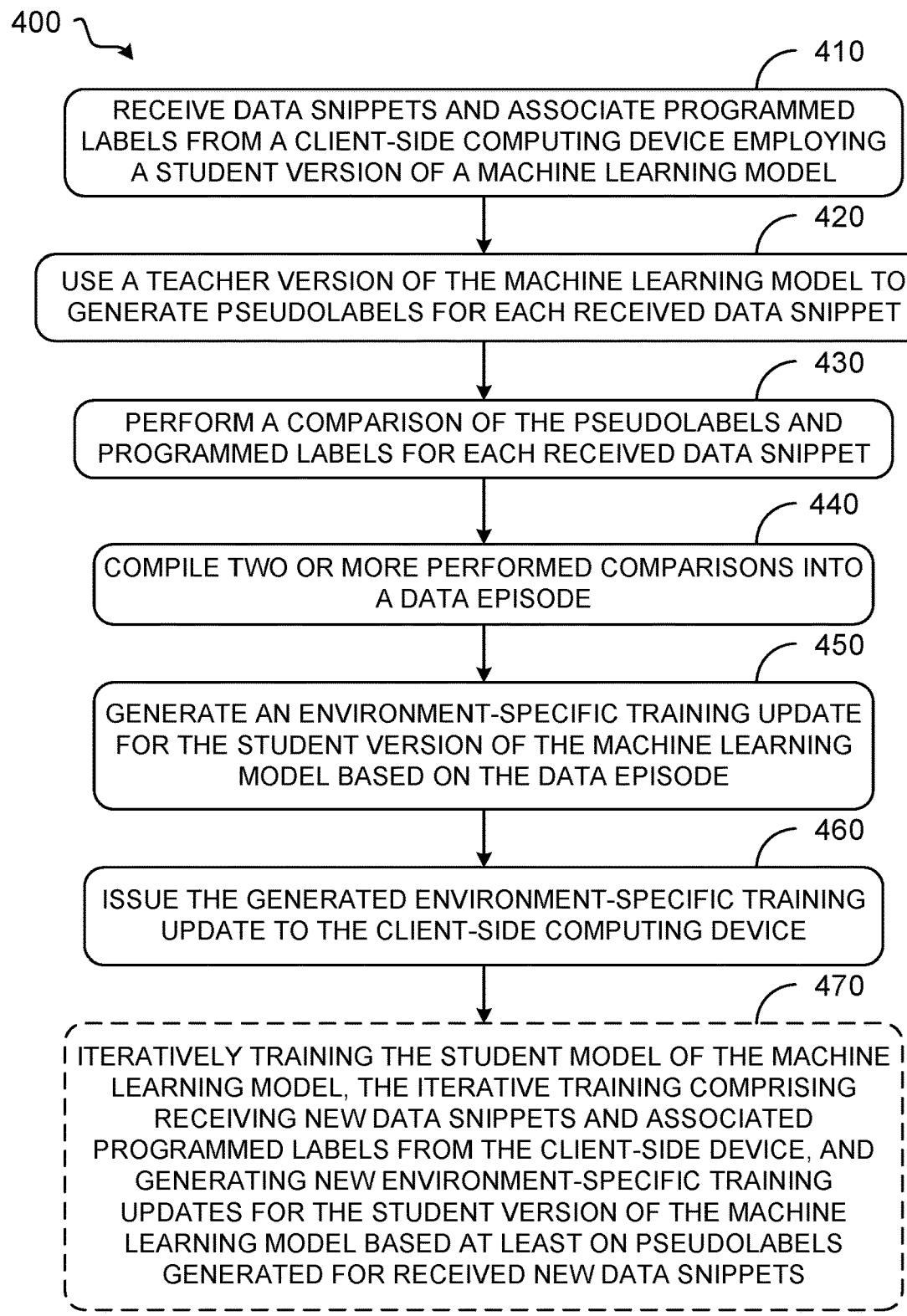
FIG. 4 is an example method for retraining a machine-learning model for a local environment.

FIG. 4 depicts a method 400 for retraining a machine-learning model for a local environment. Method 400 may be executed by a server-side computing device operating a teacher version of a machine learning model in a remote environment, such as server-side computing device 202.

At 410, method 400 includes receiving data snippets and associated programmed labels from a client-side computing device employing a student version of a machine learning model. For example, the student version may have been deployed by the teacher version for use in a local environment where the client-side computing device operates. In some examples, data snippets and associated programmed labels may be received from two or more client-side computing devices operating in different local environments.

At 420, method 400 includes using a teacher version of the machine learning model to generate pseudolabels for each received data snippet. As described with regard to FIG. 2, the teacher version may have additional complexity, available time and resources, and additional training that are not available to the student version. As such, even though the pseudolabels are not ground-truthed by a human operator, the pseudolabels are likely to be more accurate that the programmed labels generated by the student version.

At 430, method 400 includes performing a comparison of the pseudolabels and programmed labels for each received data snippet. Continuing at 440, method 400 includes compiling two or more performed comparisons into a data episode. The resultant data episode may include a predetermined number of data snippets, or may include a number of data snippets determined based on at least some of the pseudolabels and/or programmed labels.

At 450, method 400 includes generating an environment-specific training update for the student version of the machine learning model based on the data episode. In some examples, generating an environment-specific training update is based on the comparison of the pseudolabels and programmed labels demonstrating a difference greater than a threshold.

In examples where multiple client-side computing devices are operating student versions, a different environment-specific training update may be generated for each client-side computing device based at least on the received data snippets and associated programmed labels for that client-side computing device. At least some aspects of each different environment-specific training update may be based on data snippets and associated programed labels received from one or more other client-side computing devices. In other words, the training updates for one student version may be generated based on data collected from multiple student versions operating in separate local environments. At 460, method 400 includes issuing the generated environment-specific training update to the client-side computing device. The generated environment-specific training update may include one or more selection parameters that may govern which newly generated data snippets are selected for upload and evaluation. Optionally, at 470, method 400 includes iteratively training the student model of the machine learning model, the iterative training comprising receiving new data snippets and associated programmed labels from the client-side device, and generating new environment-specific training updates for the student version of the machine learning model based at least on pseudolabels generated for received new data snippets. In this way, the teacher version may continuously evaluate the student version based on the output of the student version at each update.

In the described implementation, even if the teacher version and student version operate the exact same model, the teacher can spend more time with the data snippets, and run different kinds of inference of the data (e.g., multi-scale inference on high resolution input data), thereby generating improvements that can be implemented for the student version in that local environment.

The teacher version may use the same machine learning model and the same type of neural network or, for example, a heavier model. For example, in person detection from 2D images, there exist different network architectures, including large and small networks. The teacher version may use a larger, heavier network, as those are typically more accurate, but such networks are impractical for real-time or near real-time usage in the student version.

Figure 5:
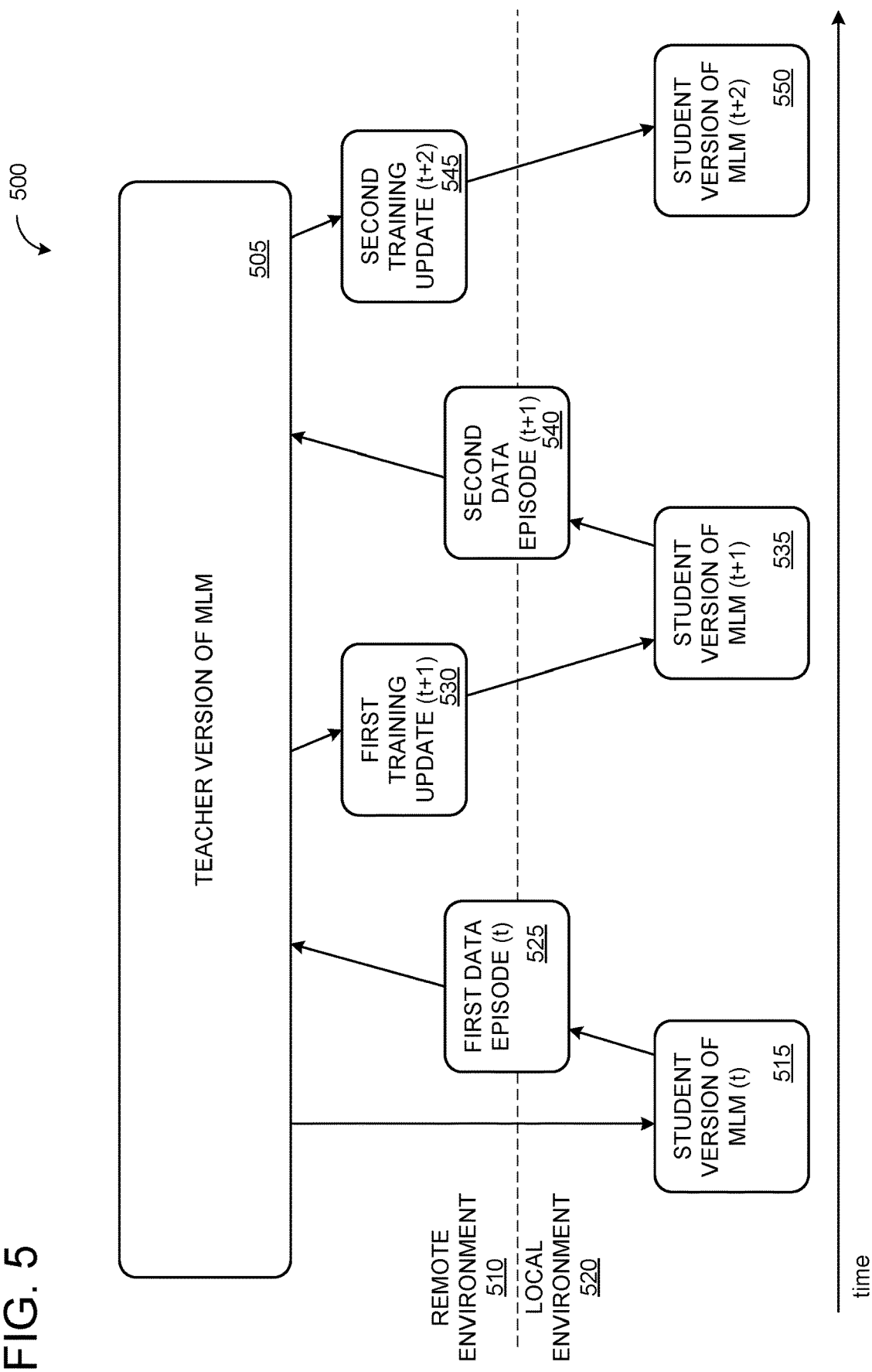
FIG. 5 is an example workflow for iterative active distillation of a machine learning model.

FIG. 5 shows an example workflow 500 for deploying and retraining a machine learning model specific to a local environment over time. A teacher version of a machine learning model 505 may operate in a remote environment 510. Teacher version 505 may deploy a student version (t) of the machine learning model 515 to local environment 520. Student version 515 may be a generic model. For example, the same student version may be deployed to multiple local environments.

The teacher version may be a deep, many layered neural network that can generate pseudolabels for data snippets from a variety of local environments. Each student version 515 may have a much more narrow, specific environment in which it is operating in real-time or near real-time. Student version 515 is doing inference on data snippets, often continuously, potentially with multiple data snippets per second. However, student version 515 is not receiving labels for those data snippets, and thus does not know in real time whether the inferences are correct or not.

As described with regard to FIG. 2, a first data episode (t) 525 may be compiled featuring a portion of data snippets evaluated by student version 515 and associated programmed labels along with pseudolabels applied to those data snippets by teacher version 505. A comparison between the programmed labels and the pseudolabels may be used as the basis for a first training update (t+1) 530.

Real, conventional ground-truth labels are generated by humans. Such labels may be used in training teacher version 505. In this workflow, pseudolabels are generated by teacher version 505, in remote environment 510. The pseudolabels may not be completely accurate, but should be more accurate than the programmed labels generated by student version 515.

First training update (t+1) 530 may then be based on the specifics of that environment—shadow and lighting patterns, background noises, languages, dialects, and accents of users, identities of specific users, etc. In the example of FIG. 1, there may be multiple surveillance cameras inside the store and trained on the parking lot, but each store parking lot has its own features and challenges. These surveillance cameras are typically placed in static locations. If a generic person detection model is deployed to the store, the initial student version 515 of the model may miss people when given only generic training.

For 2D image detection and classification, student version 515 generally operates online on the order of 15 frames/second. Teacher version 505 can operate offline, and thus may spend much longer performing inference on each frame in order to generate pseudolabels that are more accurate than programmed labels output by student version 515.

Once the system is operating in local environment 520, student model 515 is trained on those camera locations. This may require temporal training (e.g., changes in light and shadow that occur over the day). First training update 530 may also allow a model to use information from multiple camera angles to reach a single conclusion or label. By comparing the best guesses of student version 515 and teacher version 505, analysis of environmental characteristics by student version 515 may be improved. For example, if a tree in a parking lot casts a predictable shadow at a certain time of day, a person detection task may account for such a shadow, and change the weighting of person detection parameters to compensate for changes in detectable colorization.

Applying first training update 530 to student version 515 generates second student version of MLM (t+1) 535. At or shortly following deployment, training updates may be frequent. For example, for continuous 2D image capture, training updates may initially be issued on the order of weekly. As the student version is retrained to the local environment, training updates may become less frequent. If the student version is labeling the data snippets within a threshold accuracy of the teacher version, there may not be a need for retraining. If the student version's performance falls short of the threshold, one a second training update may be issued.

Inaccuracies may be collated over time to form a data episode that has sufficient information to generate a training update. For example, rare event detection may take numerous instances of the rare event to generate a pattern that is usable for generating a training update.

Second version 535 may generate enough labeled data to form a second Data Episode (t+1) 540, which can be used as the basis for a second training update (t+2) 545. Second training update (t+2) 545 may be applied to student version 535 to generate a student version of the machine learning model (t+2) 550 This process may occur iteratively, whereby data episodes are compiled and then the student model gets updated and tuned for local environment 520.

As long as teacher version 505 can perform more accurate labeling than the student version, the student version will automatically realize improvement during retraining without requiring a human to do ground truth labeling of the data snippets. This system allows for inexpensive retraining that can be implemented whenever a threshold difference in labeling is recognized at the episode compiler, as opposed to time consuming human training which generally has a low incidence of retraining updates.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
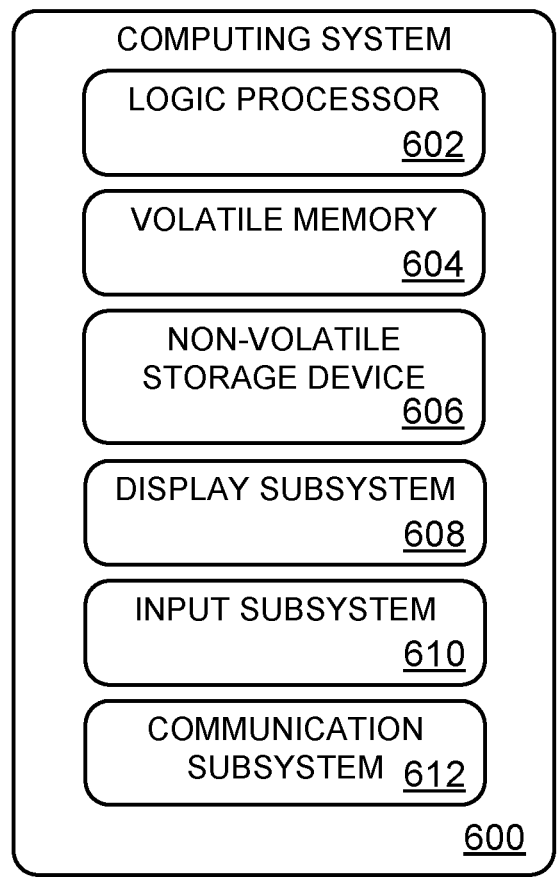
FIG. 6 shows a schematic view of an example computing environment in which the computer device of FIG. 2 may be enacted.

FIG. 6 schematically shows a non-limiting embodiment of a computing system 600 that can enact one or more of the methods and processes described above. Computing system 600 is shown in simplified form. Computing system 600 may embody the computer device 200 described above and illustrated in FIG. 2. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HIVIM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

In one example, a method for environment-specific training of a machine learning model comprises receiving, for a local environment, a data stream including a plurality of sequential data snippets; using a student version of a machine learning model, generating programmed labels for each data snippet; selecting a portion of data snippets for evaluation by a teacher version of the machine learning model; uploading the selected portion of data snippets and associated programmed labels to a server-side computing device that includes the teacher version of the machine learning model; receiving an environment-specific training update from the server-side computing device, the environment-specific training update based at least on a comparison of the programmed labels associated with the selected portion of data snippets and pseudolabels generated by the teacher version of the machine learning model for the selected portion of data snippets; applying the environment-specific training update to the student version of the machine learning model to generate an updated student version of the machine learning model; using the updated student version of the machine learning model, generating programmed labels for newly received data snippets; and providing at least some of the newly received data snippets and generated programmed labels to a local output for use in evaluating events within the local environment. In such an example, or any other example, the method additionally or alternatively comprises performing an updating procedure, the updating procedure comprising selecting a portion of newly received data snippets and uploading the selected portion of newly received data snippets to the server-side computing device for evaluation by the teacher version of the machine learning model, receiving new environment-specific training updates from the server-side computing device, and applying the new environment-specific training updates to generate updated student versions of the machine learning model. In any of the preceding examples, or any other example, the environment-specific training update additionally or alternatively includes one or more selection parameters usable to determine a portion of newly received data snippets to select for evaluation by the teacher version of the machine learning model. In any of the preceding examples, or any other example, the one or more selection parameters included in the training update additionally or alternatively include a selection frequency. In any of the preceding examples, or any other example, the portion of data snippets selected for evaluation are additionally or alternatively selected randomly. In any of the preceding examples, or any other example, the portion of data snippets selected for evaluation are additionally or alternatively selected at least in part based on the programmed labels. In any of the preceding examples, or any other example, the portion of data snippets selected for evaluation are additionally or alternatively selected at least in part based on confidence ratings assigned to one or more programmed labels.

In another example, a system for deploying a machine-learning model in a local environment comprises a local data interface configured to receive a data stream including a plurality of sequential data snippets for the local environment; a student version of a machine learning model configured to generate programmed labels for each data snippet; a selector configured to select a portion of data snippets for evaluation by a teacher version of the machine learning model; and a client-side network interface configured to upload the selected portion of data snippets and associated programmed labels to a server-side computing device, and to receive an environment-specific training update from the server-side computing device, the environment-specific training update based at least on a comparison of the programmed labels associated with the selected portion of data snippets and pseudolabels generated by the teacher version of the machine learning model for the selected portion of data snippets. In such an example, or any other example, the client-side computing device further additionally or alternatively comprises one or more sensors configured to generate the data stream within the local environment. In any of the preceding examples, or any other example, the data stream additionally or alternatively includes one or more 2D image streams, and where each data snippet includes one or more image frames. In any of the preceding examples, or any other example, the data stream additionally or alternatively includes one or more 3D image streams, and where each data snippet includes one or more image frames. In any of the preceding examples, or any other example, the data stream additionally or alternatively includes one or more audio streams, and wherein each data snippet includes a finite chunk of audio data. In any of the preceding examples, or any other example, the student version of the machine learning model is additionally or alternatively configured to provide at least some of the sequential data snippets and associated programmed labels to a local output.

In yet another example, a method for retraining a machine-learning model for a local environment comprises receiving data snippets and associated programmed labels from a client-side computing device employing a student version of a machine learning model; using a teacher version of the machine learning model, generating pseudolabels for each received data snippet; performing a comparison of the pseudolabels and programmed labels for each received data snippet; compiling two or more performed comparisons into a data episode; generating an environment-specific training update for the student version of the machine learning model based on the data episode; and issuing the generated environment-specific training update to the client-side computing device. In such an example, or any other example, generating an environment-specific training update is additionally or alternatively based on the comparison of the pseudolabels and programmed labels demonstrating a difference greater than a threshold. In any of the preceding examples, or any other example, the teacher version of the machine learning model is additionally or alternatively initially trained at least in part through human supervision.

In any of the preceding examples, or any other example, the method additionally or alternatively comprises iteratively training the student model of the machine learning model, the iterative training comprising receiving new data snippets and associated programmed labels from the client-side device, and generating new environment-specific training updates for the student version of the machine learning model based at least on pseudolabels generated for received new data snippets. In any of the preceding examples, or any other example, the method additionally or alternatively comprises receiving data snippets and associated programmed labels from two or more client-side computing devices operating in different local environments. In any of the preceding examples, or any other example, the method additionally or alternatively comprises, for each client-side computing device, generating a different environment-specific training update based at least on the received data snippets and associated programmed labels for that client-side computing device. In any of the preceding examples, or any other example, at least some aspects of each different environment-specific training update are additionally or alternatively based on data snippets and associated programed labels received from one or more other client-side computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for environment-specific training of a machine learning model, comprising:

for two or more local environments:

receiving, for a respective local environment of the two or more local environments, a data stream including a plurality of sequential data snippets;

using a student version of a machine learning model specific to the respective local environment, generating programmed labels for each data snippet of the plurality of sequential data snippets;

based at least on the generated programmed labels, selecting a portion of the plurality of sequential data snippets for evaluation by a teacher version of the machine learning model;

uploading the selected portion of the data snippets and associated programmed labels to a server-side computing device that includes the teacher version of the machine learning model;

receiving a respective environment-specific training update from the server-side computing device, the respective environment-specific training update based at least on a comparison of the programmed labels associated with the selected portion of the data snippets and pseudolabels generated by the teacher version of the machine learning model for the selected portion of the data snippets;

applying the respective environment-specific training update to the student version of the machine learning model specific to the respective local environment to generate an updated student version of the machine learning model specific to the respective local environment;

using the updated student version of the machine learning model specific to the respective local environment, generating programmed labels for newly received data snippets; and providing at least some of the newly received data snippets and generated programmed labels to a respective local output for use in evaluating events within the respective local environment.

2. The method of claim 1, further comprising:

iteratively performing an updating procedure, the updating procedure comprising selecting a portion of newly received data snippets and uploading the selected portion of newly received data snippets to the server-side computing device for evaluation by the teacher version of the machine learning model, receiving new respective environment- specific training updates from the server-side computing device, and applying the new respective environment-specific training updates to generate updated student versions of the machine learning model specific to the respective local environment.

3. The method of claim 1, wherein each respective environment-specific training update includes one or more selection parameters usable to determine a portion of newly received data snippets to select for evaluation by the teacher version of the machine learning model.

4. The method of claim 3, wherein the one or more selection parameters included in the training update include a selection frequency.

5. The method of claim 1, wherein the portion of the data snippets selected for evaluation are selected at least in part based on confidence ratings assigned to one or more programmed labels.

6. A system for deploying a machine-learning model in two or more local environments, comprising:

for each of two or more local environments:

a local data interface configured to receive a data stream including a plurality of sequential data snippets for a respective local environment of the two or more local environments;

a student version of a machine learning model specific to the respective local environment configured to generate programmed labels for each data snippet of the plurality of sequential data snippets;

a selector configured to select, based at least on the generated programmed labels, a portion of the plurality of sequential data snippets for evaluation by a teacher version of the machine learning model; and a client-side network interface configured to upload the selected portion of the data snippets and associated programmed labels to a server-side computing device, and to receive a respective environment-specific training update from the server-side computing device, the respective environment-specific training update based at least on a comparison of the programmed labels associated with the selected portion of the data snippets and pseudolabels generated by the teacher version of the machine learning model for the selected portion of the data snippets.

7. The system of claim 6, wherein the client-side computing device further comprises one or more sensors configured to generate the data stream within the respective local environment.

8. The system of claim 6, wherein the data stream includes one or more 2D image streams, and where each data snippet includes one or more image frames.

9. The system of claim 6, wherein the data stream includes one or more 3D image streams, and where each data snippet includes one or more image frames.

10. The system of claim 6, wherein the data stream includes one or more audio streams, and wherein each data snippet includes a finite chunk of audio data.

11. The system of claim 6, wherein the student version of the machine learning model is further configured to provide at least some of the plurality of sequential data snippets and associated programmed labels to a respective local output.

12. A method for retraining a machine-learning model for a local environment, comprising:

receiving data snippets and associated programmed labels from each client-side computing device of two or more client-side computing devices operating in different local environments, wherein each client-side computing device employs a student version of a machine learning model to generate the programmed labels for the data snippets by which the data snippets are selected from a plurality of sequential data snippets by a selector based on the programmed labels;

using a teacher version of the machine learning model, generating pseudolabels for each received data snippet;

performing a comparison of the pseudolabels and programmed labels for each received data snippet;

compiling two or more performed comparisons into a data episode; and for each client-side computing device of the two or more client-side computing devices:

generating a different environment-specific training update for the student version of the machine learning model of the client-side computing device based at least on the data episode, the data snippets and associated programmed labels received for that client-side computing device, wherein each different environment-specific training update indicates a change in one or more selection parameters usable by the respective student version of the machine learning model to determine a portion of newly received data snippets to select for evaluation by the teacher version of the machine learning model, and issuing the generated environment-specific training update to the client-side computing device.

13. The method of claim 12, wherein generating an environment-specific training update is based on the comparison of the pseudolabels and programmed labels demonstrating a difference greater than a threshold.

14. The method of claim 12, wherein the teacher version of the machine learning model is initially trained at least in part through human supervision.

15. The method of claim 12, further comprising:

iteratively training the student model of the machine learning model, the iterative training comprising receiving new data snippets and associated programmed labels from the client-side device, and generating new environment-specific training updates for the student version of the machine learning model based at least on pseudolabels generated for received new data snippets.

16. The method of claim 12, wherein at least some aspects of each different environment-specific training update are based on data snippets and associated programed labels received from one or more other client-side computing devices.

17. The method of claim 1, wherein the portion of the data snippets selected for evaluation are selected at least in part based on similarities to already selected data snippets.

18. The method of claim 1, wherein providing at least some of the newly received data snippets and generated programmed labels to the respective local output for use in evaluating events within the respective local environment includes initiating automated tasks within the respective local environment.

19. The method of claim 1, wherein providing at least some of the newly received data snippets and generated programmed labels to the respective local output for use in evaluating events within the respective local environment includes tracking one or more aspects of the respective local environment over time.

20. The method of claim 15, wherein a frequency of generating new environment-specific training updates for the student version of the machine learning model automatically changes over time.

\* \* \* \* \*